United States Patent
Anagnostou et al.

(10) Patent No.: US 10,602,749 B2
(45) Date of Patent: Mar. 31, 2020

(54) FOODSTUFF PRESERVING COMPOSITION AND USE THEREOF

(71) Applicant: Niacet b.v., AB Tiel (NL)

(72) Inventors: Angeliki Anagnostou, Nieuwegein (NL); Juhana Ahola, Vantaa (FI); Dominicus Brendler, Aschaffenburg (DE); Peter Van Kuik, Tiel (NL); Henk Jan Van Lent, Arnhem (NL); Jukka Hietala, Porvoo (FI); Jeroen Martens, Nijmegen (NL)

(73) Assignee: NIACET b.v., Ab Tiel (NL)

( * ) Notice: Subject to any disclaimer, the term of this patent is extended or adjusted under 35 U.S.C. 154(b) by 0 days.

(21) Appl. No.: 13/853,127

(22) Filed: Mar. 29, 2013

(65) Prior Publication Data

US 2013/0259998 A1    Oct. 3, 2013

Related U.S. Application Data

(60) Provisional application No. 61/617,748, filed on Mar. 30, 2012.

(30) Foreign Application Priority Data

Mar. 30, 2012 (EP) .................... 12162532

(51) Int. Cl.
  *A23B 4/20* (2006.01)
  *A23L 13/40* (2016.01)
  *A23L 13/60* (2016.01)
(52) U.S. Cl.
  CPC .............. *A23B 4/20* (2013.01); *A23L 13/42* (2016.08); *A23L 13/65* (2016.08)

(58) Field of Classification Search
  CPC ...... A23L 1/31409; A23L 1/3175; A23B 4/20
  See application file for complete search history.

(56) References Cited

U.S. PATENT DOCUMENTS 3,118,771 A * 1/1964 Albrecht ................. 426/250
4,915,962 A * 4/1990 Howard .................. 426/74
(Continued)

FOREIGN PATENT DOCUMENTS

GB       543582    *   3/1942
GB       543582 A      3/1942
(Continued)

OTHER PUBLICATIONS

Updated Compliance Guidelines to Control L. Monocytogenes in Post Lethality Exposed Ready to Eat Meat and poultry Products p. 62 May 2006 https://meathaccp.wisc.edu/validation/assets/Lm_Rule_Compliance_Guidelines_May_2006.pdf (Year: 2006).*

(Continued)

*Primary Examiner* — Felicia C Turner
(74) *Attorney, Agent, or Firm* — Thomas|Horstemeyer, LLP (57) ABSTRACT

The invention relates to a foodstuff preservation composition comprising potassium acetate and alkali metal diacetate. The present invention further relates to a use of the foodstuff preservation composition for preventing growth of *Listeria* strain and mesophilic aerobic bacteria under storage conditions. Additionally it relates to a method for preserving foodstuff, and to a cooked meat product comprising said composition.

18 Claims, 5 Drawing Sheets

(56) References Cited

U.S. PATENT DOCUMENTS

2003/0108648 A1* 6/2003 Ming et al. .................. 426/532
2006/0127547 A1 6/2006 Bontenbal et al.
2008/0317921 A1 12/2008 Botenbal

FOREIGN PATENT DOCUMENTS

WO 03/005963 A2 1/2003
WO 2005/034640 A1 4/2005
WO 2011/014669 A1 2/2011

OTHER PUBLICATIONS

International Search Report from European Application 12162532.1; Prepared by Peter Boddaert; dated Sep. 11, 2012.
Stekelenburg; Enhanced Inhibition of Listeria Monocytogenes in Frankfurter Sausage by the Addition of Potassium Lactate and Sodium Diacetate Mistures; Food Microbiology; 20 (2003); 133-137.
"Laboratory Stock Solutions and Equipment: Common Stock Solutions, Buffers, and Media", Current Protocols in Cell Biology. A.2A.1-A.2A.10 (1998).

* cited by examiner

FOODSTUFF PRESERVING COMPOSITION AND USE THEREOF

CROSS-REFERENCE TO RELATED APPLICATIONS

This application claims priority to U.S. Provisional Patent Application entitled "A Foodstuff Preserving Composition and Use Thereof," having Ser. No. 61/617,748, filed on Mar. 30, 2012 and European Application No. 12162532.1, filed on Mar. 30, 2012, both of which are entirely incorporated herein by reference.

FIELD OF THE INVENTION

The present invention relates to a foodstuff preservation composition comprising essentially of potassium acetate and alkali metal diacetate. The present invention further relates to a use of the foodstuff preservation composition. The present invention additionally relates to a method for preserving foodstuff, and to a cooked meat product comprising the foodstuff preservation composition.

BACKGROUND ART

*Listeria monocytogenes* (also known as *L. monocytogenes* or *Listeria*) has been recognized as a hazardous organism likely to occur in foodstuffs, such as cooked (ready-to-eat) meat, fish and poultry products. Regarding listeriosis, it is indicated that ready-to-eat-food, such as deli meats and frankfurters both pose a major risk per serving of illness/death from this organism.

A major concern includes the ability of *Listeria monocytogenes* to survive in processing environments, re-contaminate products during post-thermal processing, and subsequent growth in the finished product at refrigeration temperatures.

It has been indicated that the salts of lactic acid and acetic acid have significant antimicrobial activity against *Listeria*. Incorporation of lactate and/or diacetate into product formulation has been widely used to prevent growth of *Listeria* with the advantages of low cost and assurance of residual activity after opening the package (Lianou A., Geornaras I., Kendall P. A., Belk K. E., Scanga J. A., Smith G. C., and Sofos J. N., 2007, Fate of *Listeria monocytogenes* in commercial ham, formulated with or without antimicrobials under conditions simulating contamination in the processing or retail environment and during home storage, J. Food Prot., 70:378-385).

WO 2011/014669 A1 discloses an antimicrobial preservative composition for food products comprising: lactic acid or a salt thereof, acetic acid or a salt thereof, and propionic acid or a salt thereof. It further discloses a food product and a method for producing the food product comprising the preservative composition.

US patent application 2008/0317921A1 relates as well to the use of salts of lactic acid and/or acetic acid in preservation. It discloses a process for manufacturing a cooked meat product with increased shelf-life stability and an increased resistance against the growth of bacteria. In the process an uncooked meat product is combined with an organic acid salt selected from lactate salts, acetate salts and combinations thereof, and a latent acid, followed by cooking the meat product. The latent acid does not show acidic properties when it is added to the uncooked meat product, but is converted to carboxylic acid during the cooking.

However, since lactates are highly hygroscopic they need to be prepared as a 60% solution (with diacetate). This negatively impacts the flavor (Stekelenburg F. K. and Kant-Muermans M. L. T., 2001, Effects of sodium lactate and other additives in a cooked ham product on sensory quality and development of a strain of *Lactobacillus curvatus* and *Listeria monocytogenes*, Int. J. Food Microbiol., 66:197-203).

Further, addition of acids to meat products is associated with a number of disadvantages. The addition of an acidic compound may detrimentally affect the taste of the meat, its structure, and various other properties, such as smell and bite.

This means that a balance needs to be found between the amount and type of acid that can be added without detrimentally affecting the taste of the meat and its other properties, and the microbiological resistance to be obtained.

SUMMARY OF THE INVENTION

Provided is a foodstuff preservation composition comprising potassium acetate and alkali metal diacetate. Provided is also a method for preserving foodstuff with said foodstuff preservation composition. Furthermore, use of said foodstuff preservation composition for preventing growth of bacteria is provided. Moreover, provided is a meat product comprising said foodstuff preservation composition.

More specifically the present invention relates to a foodstuff preservation composition according to claim 1. The present invention further relates to the method according to claim 10 for preserving foodstuff with said composition. The present invention further relates to the use according to claim 11 of said foodstuff preservation composition for preventing growth of bacteria. The present invention further relates to a meat product according to claim 12 comprising said foodstuff preservation composition.

It has been surprisingly found that a particular combination of potassium acetate and alkali metal diacetate, such as sodium diacetate and potassium diacetate, enables to manufacture foodstuff products which have a high resistance against the growth of pathogenic bacteria, in particular *Listeria monocytogenes* and mesophilic aerobic bacteria. An increased resistance against other bacteria is obtained at the same time.

Furthermore, it has been surprisingly found that the foodstuff preservation composition of potassium acetate and alkali metal diacetate does not affect detrimentally the smell, taste and texture of said foodstuff.

DETAILED DESCRIPTION OF THE INVENTION

The foodstuff preservation composition according to the first aspect of the present invention comprises potassium acetate and alkali metal diacetate, wherein the weight ratio of potassium acetate:alkali metal diacetate is from 1.5 to 9:1.

In a preferred embodiment the weight ratio of potassium acetate:alkali metal diacetate is from 2.3 to 9:1, preferably from 3 to 5.7:1, more preferably from 3.3 to 4.9:1, and most preferably 4:1.

In another preferred embodiment the potassium acetate is present in an amount of 60-90 wt-%, preferably in an amount of 70-90 wt-%, more preferably in an amount of 75-85 wt-% and even more preferably in an amount of 77-83 wt-% based on the weight of the final foodstuff preservation composition.

In another preferred embodiment the alkali metal diacetate is present in an amount of 10-40 wt-%, preferably in an amount of 10-30 wt-%, more preferably in an amount of 15-25 wt-% and even more preferably in an amount of 17-23 wt-% based on the weight of the final foodstuff preservation composition.

The alkali metal diacetate is preferably sodium diacetate, potassium diacetate or a mixture thereof. The alkali metal diacetate is most preferably potassium diacetate.

It is known from the literature that alkali metal diacetate is a solid combination of an alkali metal acetate and acetic acid which has a molar ratio of alkali metal acetate:acetic acid roughly 1:1. As an example, anhydrous sodium diacetate consists of crystalline sodium acetate with acetic acid as a solvate and may have a content of 39 to 42% of acetic acid and of 57 to 60% of sodium acetate.

Alkali metal diacetate is furthermore understood as a combination of an alkali metal base and acetic acid.

Alkali metal diacetate can be obtained by a reaction of acetic acid and alkali metal base so that the molar ratio of acetic acid:alkali metal is 2:1. In such a reaction a part of the acetic acid is neutralized by the base.

Examples of alkali metal bases are alkali metal carbonate, alkali metal bicarbonate and alkali metal hydroxide.

Alternatively, alkali metal diacetate can be obtained by crystallizing it from a solution of alkali metal acetate in water and acetic acid. In this crystalline compound the molar ratio acetic acid:alkali metal acetate is 1:1.

When the diacetate comes in contact with moisture or when it is dissolved in water or aqueous solutions, it releases acetic acid. Therefore, increasing the amount of the diacetate from the above defined amounts also increases the amount of acetic acid in the product, which in turn detrimentally affects the taste of foodstuff, its structure, and various other properties, such as smell and texture. On top of this, addition of organic acids, especially acetic acid, reduces the thermal resistance of yeast.

The potassium acetate and the alkali metal diacetates are commercially available chemicals. The potassium acetate and the alkali metal diacetate are foodstuff grade.

The physical state of the foodstuff preservation composition according to the present invention is not limited. The foodstuff preservation composition may be in a liquid or in a solid form, preferably in solid form, most preferably in powder or crystalline form. The foodstuff preservation composition in solid form is easier to transport and use than in liquid form. By using the foodstuff preservation composition in solid form no additional water is added to the final foodstuff. If it is necessary to use the foodstuff preservation composition in liquid form, the solid composition can be easily dissolved in water or in aqueous ethanol.

If the foodstuff preservation composition is in liquid form, it generally is in the form of an aqueous composition, which may be a solution or dispersion. An aqueous composition according to the present invention comprises the amounts of potassium acetate and alkali metal diacetate specified above, having a concentration of 40-70 wt-%, more preferably 50-55 wt-%.

According to a preferred embodiment the foodstuff preservation composition in its solid form further comprises an anti-caking agent. By the term "anti-caking agent" is meant a composition or compound that prevents caking of the foodstuff preservation composition powder and thus allows a more efficient and a user-friendly handling of the foodstuff preservation composition. It moreover affects how efficiently the foodstuff preservation composition gets mixed into a foodstuff. The term "anti-caking agent" is known to a person skilled in the art.

The anti-caking agent is selected from the group consisting of magnesium oxide, magnesium silicate, magnesium carbonate, magnesium phosphate, fatty acid salts of magnesium or calcium, silicon dioxide, fatty acid triglyceride, cellulose and mixtures thereof, preferably the anti-caking agent is a fatty acid salt of magnesium or calcium, more preferably calcium stearate or magnesium stearate. The anti-caking agents are commercially available and foodstuff grade.

The anti-caking agent is present in the foodstuff preservation composition in an amount of 0.01-5 wt-%, preferably 0.1-3 wt-%, and most preferably 0.5-2.5 wt-%, based on the weight of the final foodstuff preservation composition. If the anti-caking agent is present in higher amounts, it is considered as an additive, not an adjuvant.

The foodstuff preservation composition is present in the final foodstuff product in an amount of 0.05-5 wt-%, preferably 0.1-3 wt-% and most preferably 0.2-2.5 wt-%, based on the weight of the final foodstuff product. If the amount exceeds 5 wt-% the quality of the final foodstuff product begins to suffer. Smell, taste and texture are no more appealing.

Manufacturing methods of any known kind in the literature can be applied in producing the foodstuff preservation composition of the present invention. For example acetate, alkali metal diacetate and optionally an anti-caking agent are mixed together. In another example the foodstuff preservation composition is produced by adding acetic acid to potassium acetate. In yet another example the foodstuff preservation composition is produced by reacting an alkali metal base such as sodium hydroxide (NaOH), potassium hydroxide (KOH), sodium carbonate ($Na_2CO_3$) or potassium carbonate ($K_2CO_3$) with a sufficient amount of acetic acid.

In a preferred embodiment the foodstuff preservation composition is produced by adding potassium acetate and alkali metal diacetate, and optionally an anti-caking agent, to a vessel, preferably under an inert and dry atmosphere. The compounds are mixed manually or mechanically, preferably under inert and dry atmosphere until a homogeneous mixture of the compounds is obtained. The preservation composition is either used fresh or stored under dry, cool and inert conditions.

The foodstuff preservation composition of the present invention may comprise any additional components, such as additives.

By term "foodstuff" is meant any instance of material which may be used as food. The foodstuff may be cooked or uncooked. Examples of foodstuffs are meat, un- and pre-processed foods, canned foods and dairy products.

The meat may be uncooked or cooked. The word meat moreover includes pre-processed meat products. Examples of the preferred meat products are frankfurters, sausages, canned meat foods, ham, ready-to-eat foods, cold cuts and vacuum-packed meats.

It is noted that the word meat also includes poultry, fish and seafood, such as clams, crab, shellfish and lobster.

Preferably the foodstuff is meat or canned meat foods. Preferably the foodstuff preservation composition according to the present invention is a meat preservation composition.

According to the second aspect of the present invention, the present invention pertains to a method for preserving foodstuff, preferably meat, wherein the method comprises mixing the foodstuff preservation composition, preferably the meat preservation composition, according to the present invention with foodstuff.

In a preferred embodiment the meat preservation composition according to the present invention is added preferably in the powder form by stirring it through the meat product. Any components added in liquid form are combined and mixed through the meat product. In the case of pieces of meat, the meat preservation composition and any additional components are, for example, injected into the meat in liquid form. To profit from the effects of the invention it is preferred that the active compounds are present also on the inside of the meat product, and not only on the outside. Adding the meat preservation composition and any additional components by dipping pieces of meat into the solution is an alternative method. Other suitable methods, such as spraying applications, by which the meat preservation composition and any additional components can be added to the meat product will be evident to meat manufacturers and require no further disclosure here.

In one embodiment, after addition of the meat preservation composition the meat product is cooked. The cooking of meat products is part of the general domestic science knowledge of the skilled person and requires no further disclosure herein.

According to the third aspect of the present invention, the present invention pertains to a use of the foodstuff preservation composition for preventing growth of bacteria.

According to a preferable embodiment of the present invention, the use of the foodstuff preservation composition according to the present invention is being directed to decreasing, preferably preventing growth of bacteria under storage conditions. Preferably the use of the foodstuff preservation composition according to the present invention is being directed for decreasing, preferably preventing growth of *Listeria* strain, mesophilic aerobic bacteria, *salmonella*, *E. coli* and lactic acid bacteria under storage conditions, preferably of *Listeria* strains and mesophilic aerobic bacteria.

By storage conditions, such as cold storage conditions, are meant conditions in which the foodstuff is stored. For example in case of meat the cold storage conditions includes temperatures such as from 2 to 8° C.

According to the fourth aspect of the present invention, the present invention pertains to a meat product comprising the foodstuff preservation composition according to the present invention. The meat product may be cured or uncured. Examples of suitable uncured meat products are cooked chicken, turkey and roast beef. Examples of suitable cured meat products are cured pork ham, frankfurters, and other cured sausages.

The present invention is illustrated by the following examples, without in any way being limited thereto or thereby.

EXPERIMENTAL

Example 1

Preparation of Foodstuff Preservation Composition Comprising Potassium Acetate and Potassium Diacetate Potassium acetate (80 g) and potassium diacetate (20 g) are added to a vessel, under an inert and dry atmosphere. Compounds are mixed mechanically under inert and dry atmosphere until a homogeneous mixture of compounds is obtained.

Preparation of Foodstuff Preservation Composition Comprising Potassium Acetate, Potassium Diacetate and an Anti-Caking Agent Potassium acetate (78.4 g), potassium diacetate (19.6 g) and magnesium stearate (2.0 g) are added to a vessel under an inert and dry atmosphere. The compounds are mixed mechanically under inert and dry atmosphere until a homogeneous mixture of the compounds is obtained.

Sensory Test of Frankfurters with Preservation Compositions of the Present Invention Ten preparations (frankfurters) with the preservation compositions of the present invention and one control frankfurter were prepared. Different wt-% of potassium acetate and potassium diacetate were used in the compositions. Also, the amount of the preservation composition in the final frankfurters was varied. The amounts of the compositions are disclosed in Table 1.

The preparations, regular 1.8 wt-% salt level frankfurters, can be prepared by any known method. Ten 3100 g dough's were prepared from which the frankfurters were prepared. To nine of the dough's preservation compositions were added and one dough was the control (no preservation composition was added).

TABLE 1

|  | control (1) (g) | 2 (g) | 3 (g) | 4 (g) | 5 (g) | 6 (g) | 7 (g) | 8 (g) | 9 (g) | 10 (g) |
|---|---|---|---|---|---|---|---|---|---|---|
| potassium acetate 83%:potassium diacetate 17% | 0.75% | 0.000 | 23.25 | 0.000 | 0.000 | 0.000 | 0.000 | 0.000 | 0.000 | 0.000 |
| potassium acetate 83%:potassium diacetate 17% | 1% | 0.000 | 0.000 | 31.00 | 0.000 | 0.000 | 0.000 | 0.000 | 0.000 | 0.000 |
| potassium acetate 83%:potassium diacetate 17% | 1.45% | 0.000 | 0.000 | 0.000 | 44.95 | 0.000 | 0.000 | 0.000 | 0.000 | 0.000 |
| potassium acetate 80%:potassium diacetate 20% | 0.75% | 0.000 | 0.000 | 0.000 | 0.000 | 23.25 | 0.000 | 0.000 | 0.000 | 0.000 |
| potassium acetate 80%:potassium diacetate 20% | 1% | 0.000 | 0.000 | 0.000 | 0.000 | 0.000 | 31.00 | 0.000 | 0.000 | 0.000 |
| potassium acetate 80%:potassium diacetate 20% | 1.25% | 0.000 | 0.000 | 0.000 | 0.000 | 0.000 | 0.000 | 38.75 | 0.000 | 0.000 |
| potassium acetate 75%:potassium diacetate 25% | 0.50% | 0.000 | 0.000 | 0.000 | 0.000 | 0.000 | 0.000 | 0.000 | 15.50 | 0.000 |
| potassium acetate 75%:potassium diacetate 25% | 0.75% | 0.000 | 0.000 | 0.000 | 0.000 | 0.000 | 0.000 | 0.000 | 0.000 | 23.25 |
| potassium acetate 75%:potassium diacetate 25% | 1% | 0.000 | 0.000 | 0.000 | 0.000 | 0.000 | 0.000 | 0.000 | 0.000 | 31.00 |

Sensory evaluations were carried out in three sessions. Three preservation compositions (preparations) with the same potassium acetate:potassium diacetate ratio were evaluated relatively to the reference by a taste panel. The taste panel (twelve panelists) determined the frankfurters they generally preferred by evaluating smell, taste and bite. Results are shown in Table 2.

TABLE 2

|  |  | 1 | 2 | 3 | 4 | 5 | 6 | 7 | 8 | 9 | 10 | 11 | 12 | Total |
|---|---|---|---|---|---|---|---|---|---|---|---|---|---|---|
| Test 1 | preparation 1 |  |  |  |  |  |  |  |  |  |  |  |  | 0 |
|  | preparation 2 |  |  |  |  |  |  | x |  |  | x |  |  | 2 |
|  | preparation 3 |  |  |  |  | x |  |  |  | x |  |  |  | 2 |
|  | preparation 4 | x | x |  |  |  | x |  |  |  |  | x |  | 4 |
| Test 2 | preparation 1 | x |  | x |  |  |  |  |  |  |  |  |  | 2 |
|  | preparation 5 |  | x |  | x | x | x |  |  |  |  |  |  | 4 |
|  | preparation 6 |  | x |  | x |  |  | x |  |  | x |  |  | 4 |
|  | preparation 7 |  | x |  | x | x |  |  | x | x |  | x | x | 7 |
| Test 3 | preparation 1 | x |  | x | x |  |  |  |  | x |  | x |  | 5 |
|  | preparation 8 |  |  |  |  | x |  | x | x |  |  |  |  | 3 |
|  | preparation 9 |  |  |  | x |  |  |  |  |  | x |  | x | 3 |
|  | preparation 10 |  | x |  |  |  |  |  |  |  | x | x |  | 3 |

The frankfurter (preparation) number 7 was the most preferred. The preservation composition 7 had the potassium acetate:potassium diacetate ratio of 80%:20%. This preservative was chosen to perform additional experiments with.

Example 2

Comparison of Preservation Compositions

Preparation of Regular 1.8 wt-% Salt Level Frankfurter
Raw meat (pork butt, pork back fat, and 85% lean beef) and non-meat ingredients were purchased except for the antimicrobial ingredients (preservative compositions) that were from Kemira ChemSolutions b.v.
Frankfurters can be prepared by any known method. Table 3 discloses the tested preservation compositions and the amounts of the preservation compositions in the frankfurters.

TABLE 3

| Formulation | Preservation composition | Amount of the preservative in the frankfurter (wt-%) | Abbreviation of the Formulation |
|---|---|---|---|
| Control | no preservative |  | CTR |
| Composition 2 | sodium lactate 50%:sodium acetate 50% | 0.5 | 0.5% PP |

TABLE 3-continued

| Formulation | Preservation composition | Amount of the preservative in the frankfurter (wt-%) | Abbreviation of the Formulation |
|---|---|---|---|
| Composition 3 | sodium lactate 50%:sodium acetate 50% | 1.0 | 1.0% PP |
| Composition 4 | sodium lactate 38%:sodium acetate 38%:sodium diacetate 23% | 0.65 | 0.65% PD |
| Composition 5[a] | potassium acetate 80%:potassium diacetate 20% | 0.75 | 0.75% PK |
| Composition 6[a] | potassium acetate 80%:potassium diacetate 20% | 1.0 | 1% PK |
| Composition 7 | 60% sodium lactate solution | 2.5 | 2.5% SL |
| Composition 8 | 60% sodium lactate and sodium diacetate solution | 2.5 | 2.5% SL-SD |
| Composition 9 | 60% potassium lactate solution | 2.5 | 2.5% PL |
| Composition 10 | 60% potassium lactate and sodium diacetate solution | 2.5 | 2.5% PL-SD |

[a]Preservation composition according to the present invention.

Compositions from 2 to 6 were in powder form. Compositions from 7 to 10 were aqueous solutions.

Three groups of samples were prepared for microbial analysis, physicochemical evaluation and consumer sensory tests.

*L. monocytogenes* Strains and Frankfurter Inoculation

A cocktail (~1×10$^6$ CFU/ml) of six *L. monocytogenes* strains, representing different serotypes and pulsed field gel electrophoresis (PFGE) patterns, was used. Fifty frankfurters from each formulation were aseptically transferred to a mesh bag and submerged in the *L. monocytogenes* cocktail with gentle stirring. After 1 min, the mesh bag was removed and drained for a minute prior to transferring the frankfurters on the tray to a bio-safety hood. After the inoculum absorbed into the product for 25 minutes, two frankfurters were aseptically transferred into a 4×6 O.D. Shanvac vacuum bag and vacuum sealed. Eight bags from each formulation were stored at 4, 7, and 10° C. for up to 90 days. Uninoculated frankfurters from each formulation were also prepared in the same manner for quantification of background microflora and sensory analysis.

Microbial Analysis

Initially and after 15, 30, 45, 60, 75 and 90 days of storage at 4, 7, 10 and 15° C., *L. monocytogenes* and mesophilic aerobic bacteria (MAB) were, respectively, quantified in the inoculated and uninoculated samples. All 25-g samples were diluted in sterile phosphate buffer solution (PBS) and homogenized by stomaching for 1 min. Appropriate serial dilutions in PBS were then plated on Modified Oxford Agar (Difco, Becton Dickinson, Sparks, Md., USA) and trypticase soy agar supplemented with 0.6% (w/v) yeast extract to enumerate *L. monocytogenes* and MAB, respectively, after 48 h of incubation at 35° C.

Sensory Analysis

In each of three replications, about 50 consumer panelists were recruited to assess five samples for appearance, texture, flavor, and overall acceptability based on a 9-point hedonic scale. Frankfurters were heated (72° C.) in boiled water and kept in a warmer (63° C.) after inserting into a sealable bag. Upon serving, samples from five different treatments were cut (4 cm cross-sections) and presented to each panelist. Data were combined for a total of n=~150.

Physicochemical Analysis

Seven physiochemical parameters were evaluated for frankfurters after chopping. pH, protein, fat, moisture, and water activity were measured using a pH meter, nitrogen analyzer, fat extractor, dry oven, and AquaLab water activity meter, respectively. Sodium content was analyzed using a pH/ion analyzer after calibration, and cooking yield was calculated by the weight difference before and after cooking.

Statistical Analysis

Data were subjected to a mixed model ANOVA procedure of SAS (SAS Institute, 2002). Overall means were separated with Tukey's Test at the P<0.05 level. When replication and treatment were significant (P<0.05), the differences between treatments were separately reported for each replication using a Bonferroni adjustment based on the number of such comparisons within each replication.

Results of the Experiment

Microbial Growth

To get the target inoculation of 10$^4$ CFU/g per sample for four storage temperatures (4, 7, 10 and 15° C.), preliminary tests were conducted with all frankfurters submerged into the same prepared cocktail.

Figure 1A:
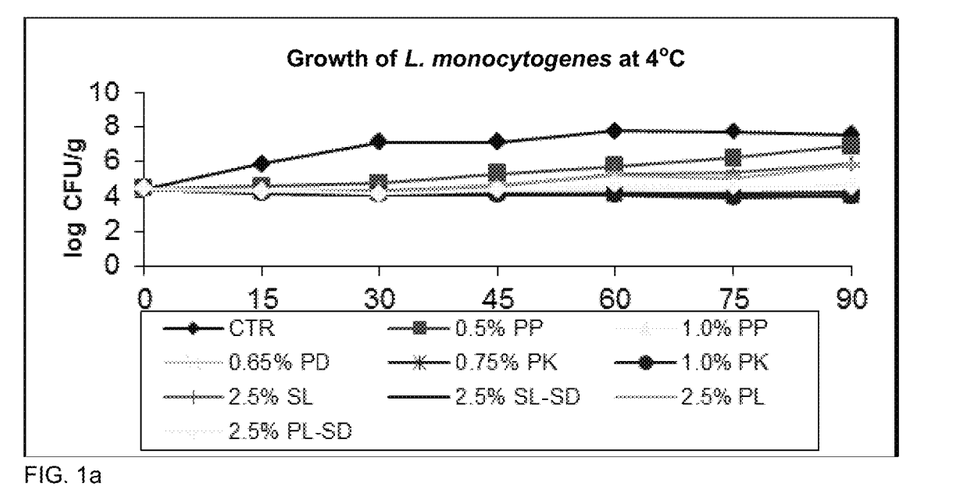
FIG. 1*a* shows growth of *L. monocytogenes* at 4° C. during 90 days of storage in inoculated frankfurters treated with various preservative compositions.

Using this method, the *L. monocytogenes* inoculation level of 10$^4$ CFU/g sample was achieved. During 90 days of storage at 4, 7, 10, or 15° C., the control formulation supported the fastest growth of *L. monocytogenes* at 4° C. (FIG. 1a). The two single lactate salts (2.5% SL and 2.5% PL) as well as the lower dosage of the lactate:acetate formulation (0.5% PP) yielded intermediate growth, whereas no growth was observed for the remaining six formulations (1% PP, 2.5% PL-SD, 2.5% SL-SD, 0.65% PD, 0.75% PK, and 1% PK) (FIG. 1a).

Figure 1B:
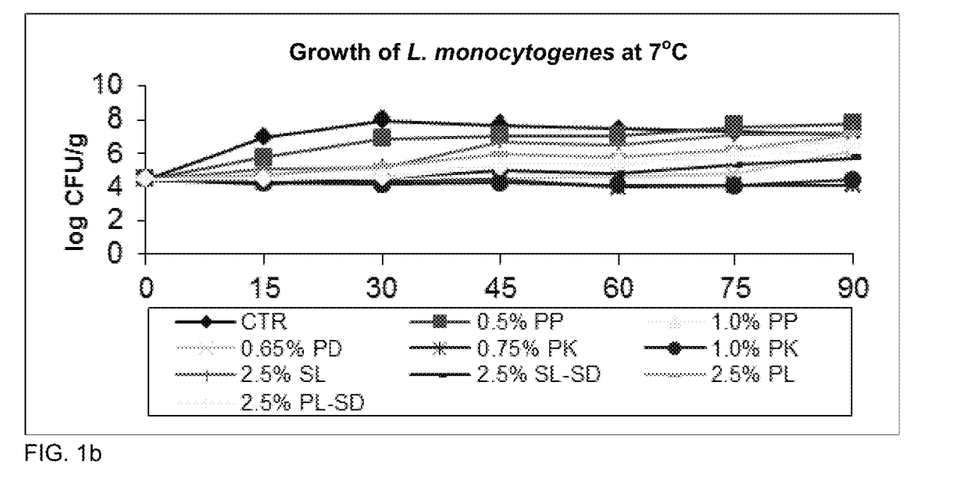
FIG. 1*b* shows growth of *L. monocytogenes* at 7° C. during 90 days of storage in inoculated frankfurters treated with various preservative compositions.

At 7° C., *L. monocytogenes* grew in two formulations (control and 0.5% PP), reaching maximum populations of 7 log CFU/g after 30 and 45 days, respectively. Slower growth of *L. monocytogenes* was seen in the six formulations (2.5% SL, 2.5% PL, 1% PP, 2.5% PL-SD, 0.65% PD, 2.5% SL-SD) with levels ranging from 5.7 to 7.3 log CFU/g after 90 days. The remaining two formulations (0.75% PK and 1% PK) completely inhibited *L. monocytogenes* during storage (FIG. 1b).

Figure 1C:
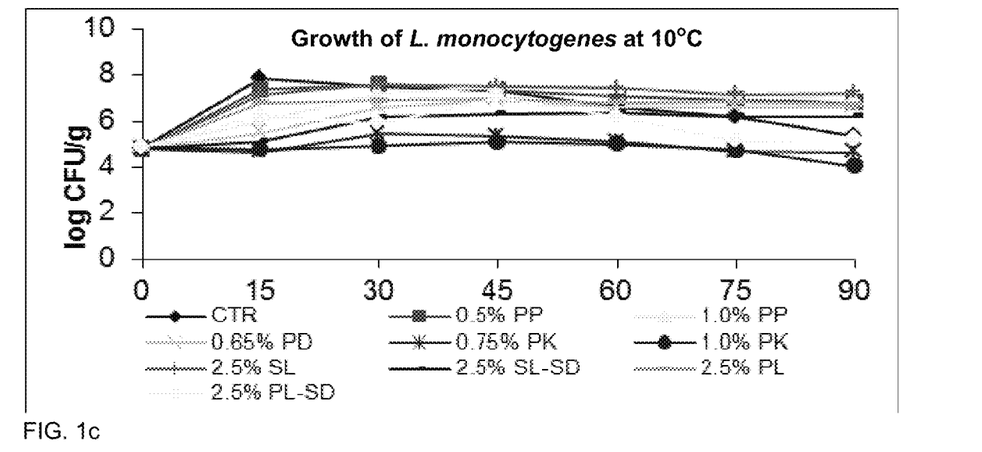
FIG. 1*c* shows growth of *L. monocytogenes* at 10° C. during 90 days of storage in inoculated frankfurters treated with various preservative compositions.
Figure 1D:
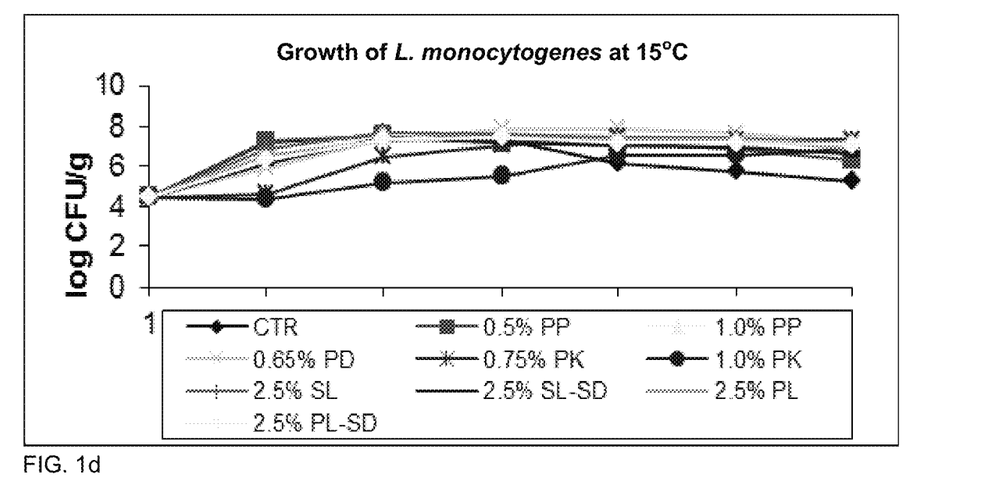
FIG. 1*d* shows growth of *L. monocytogenes* at 15° C. during 90 days of storage in inoculated frankfurters treated with various preservative compositions.

When stored at 10 and 15° C., *L. monocytogenes* rapidly grew in all formulations to 6-7 log CFU/g after 15-30 days, except for the 0.75% PK and 1% PK at 10° C., and 1% PK at 15° C. (FIG. 1c and FIG. 1d).

Figure 2A:
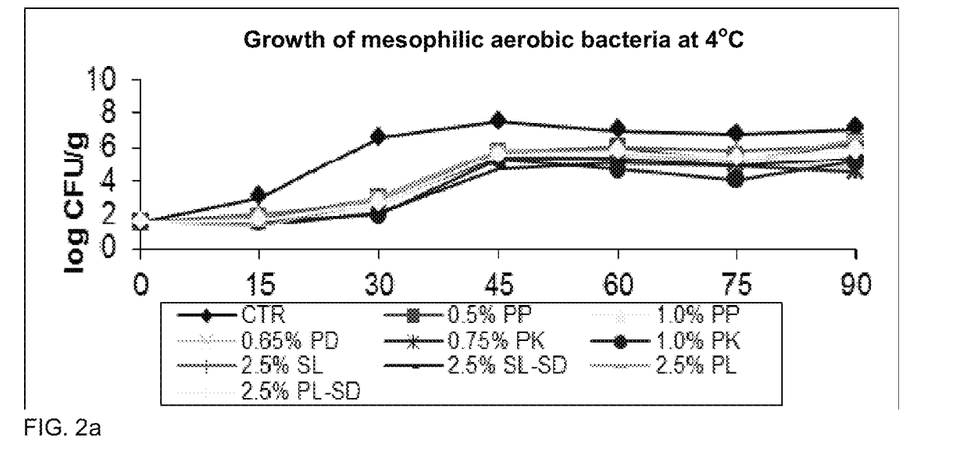
FIG. 2*a* shows growth of mesophilic aerobic bacteria (MAB) at 4° C. during 90 days of storage in uninoculated frankfurters treated with various preservative compositions.

Uninoculated frankfurters contained an initial background mesophilic aerobic bacteria (MAB) count of 1.58 log CFU/g. MAB populations in the control reached 7.5 log CFU/g after 45 days at 4° C. and maintained at this level for the rest of storage. The remaining nine treated samples also exhibited peak growths at 45 days but with significantly lower levels (4.7 to 5.8 log CFU/g) than the control (FIG. 2a). After the peak, four formulations (1% PP, 0.65% PD, 0.75% PK and 1% PK) showed a decrease in MAB levels by 0.1-0.9 log CFU/g whereas other five formulations (0.5% PP, 2.5% SL, 2.5% PL, 2.5% SL-SD, and 2.5% PL-SD) showed an increased in levels by 0.3-0.7 log CFU/g at the end of storage (FIG. 2a).

Figure 2B:
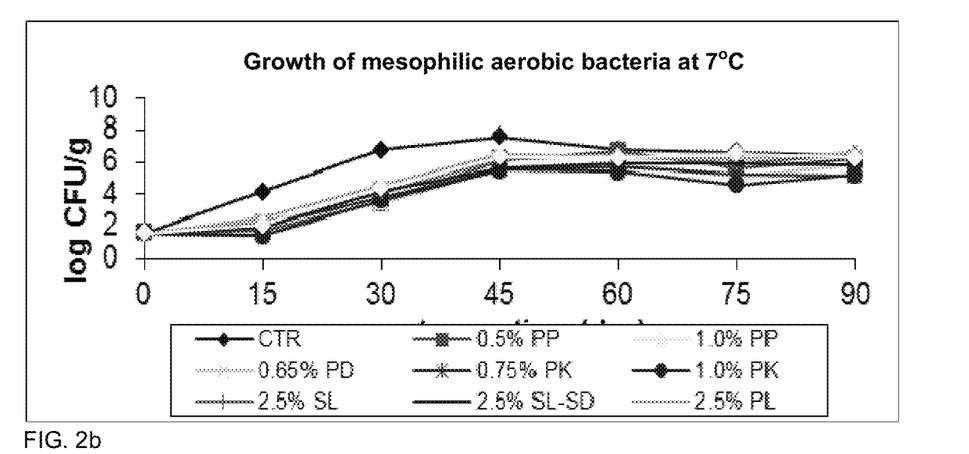
FIG. 2b shows growth of mesophilic aerobic bacteria (MAB) at 7° C. during 90 days of storage in uninoculated frankfurters treated with various preservative compositions.

At 7° C., the control yielded a maximum population of 7.6 log CFU/g at 45 days then declined to 6.4 log CFU/g. All nine samples containing inhibitors supported the growth of MAB to 5.5-6.5 log CFU/g at 45 days of storage and maintained those levels to the end of storage (FIG. 2b).

Figure 2C:
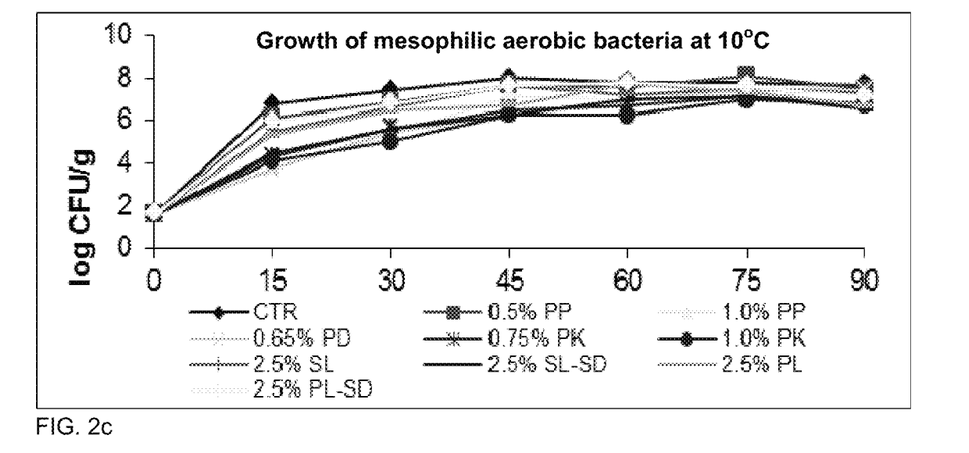
FIG. 2c shows growth of mesophilic aerobic bacteria (MAB) at 10° C. during 90 days of storage in uninoculated frankfurters treated with various preservative compositions.
Figure 2D:
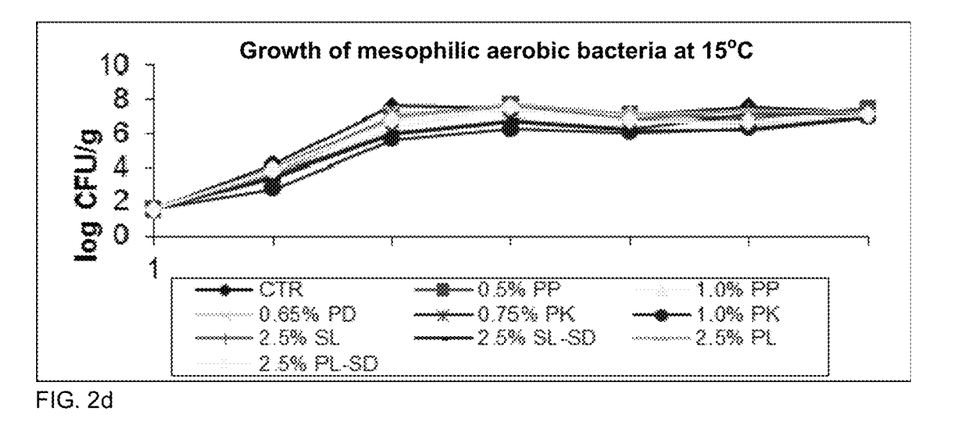
FIG. 2d shows growth of mesophilic aerobic bacteria (MAB) at 15° C. during 90 days of storage in uninoculated frankfurters treated with various preservative compositions.

At 10 and 15° C., all formulations except for 1% PK permitted rapid growth to 6 log CFU/g or higher after 30 days, eventually exceeding 7 log CFU/g during the rest of storage (FIG. 2c and FIG. 2d).

Sensory Analysis

For the evaluation of ten formulation samples, two sets of sensory tests were arranged: 1) four sodium based samples (0.5% PP, 0.65% PD, 2.5% SL and 2.5% SL-SD) and one control in the morning, and 2) four potassium based samples (0.75% PK, 1.0% PK, 2.5% PL and 2.5% PL-SD) and one control in the afternoon (Table 4). The sample containing 1% PP was not included since current USDA regulations do not permit the use of sodium diacetate (or acetate) at levels above 0.25%. In the sodium based frankfurters, no significant difference was observed for appearance, texture, flavor, and overall acceptability regardless of formulation. In potassium based frankfurters, no significant differences from the control were observed in appearance, texture, flavor, and overall acceptability regardless of the formulation.

SL-SD, 1.0% PP, while the five lowest values (950-1035 mg/100 g) were detected in formulations 2.5% PL, 2.5% PL-SD, 0.75% PK, 1.0% PK, and CTR, with the intermediate values (1172-1178 mg/100 g) seen in formulations 0.5% PP and 0.65% PD.

Regarding pH, the formulations with no- or traces of diacetate (1% PP, 2.5% PL, 2.5% PL-SD, 2.5% SL and 0.5% PP) showed the five highest values (pH 6.39-6.41), whereas the formulations with more than a trace (0.65% PD, 1.0% PK, 0.75% PK, 2.5% SL-SD) marked the five lowest values (6.21-6.26) and the intermediate value (pH 6.35) in the control. In addition to the diacetate (pH 4.5-5.0 as such), the pH might be influenced by the presence and amount of sodium acetate (pH 8.9) and sodium lactate (pH 6.3).

After cooking, six formulations (CTR, 1.0% PP, 0.65% PD, 1.0% PK, 2.5% PL, and 2.5% PL-SD) showed a cooking yield over 90%, which is ~2% higher than found for the other four formulations (~88%) (0.5% PP, 0.75% PK, 2.5% SL, and 2.5% SL-SD). Remaining parameters ($a_w$, moisture, protein, and fat) showed some variations within the minimal range <0.5% except for the fat.

TABLE 5

| CHARACTERISTICS | 0% CTR | 0.5% PP | 1.0% PP | 0.65% PD | 0.75% PK | 1.0% PK |
| --- | --- | --- | --- | --- | --- | --- |
| SODIUM | 1031 | 1178 | 1279 | 1172 | 1035 | 1021 |
| pH | 6.35 | 6.39 | 6.41 | 6.21 | 6.26 | 6.22 |
| $a_w$ | 0.956 | 0.955 | 0.950 | 0.956 | 0.950 | 0.955 |
| COOKING YIELD | 89.50 | 88.51 | 90.03 | 90.69 | 88.07 | 90.08 |
| MOISTURE | 60.79 | 60.02 | 60.50 | 60.61 | 60.50 | 60.84 |
| PROTEIN | 14.86 | 15.15 | 14.44 | 14.58 | 14.62 | 14.48 |
| FAT | 18.67 | 18.59 | 18.84 | 18.47 | 17.78 | 18.82 |

| CHARACTERISTICS | 2.5% SL | 2.5% SL-SD | 2.5% PL | 2.5% PL-SD | Standard Error |
| --- | --- | --- | --- | --- | --- |
| SODIUM | 1345 | 1328 | 950 | ND* | ND* |
| pH | 6.39 | 6.26 | 6.40 | 6.40 | 0.004 |
| $a_w$ | 0.951 | 0.949 | 0.95 | 0.953 | 0.002 |
| COOKING YIELD | 88.03 | 88.01 | 90.16 | 90.04 | 0.12 |
| MOISTURE | 60.07 | 59.71 | 60.33 | 60.11 | 0.1 |
| PROTEIN | 14.18 | 14.65 | 14.32 | 14.16 | 0.2 |
| FAT | 17.03 | 17.42 | 17.71 | 16.55 | 0.21 |

*ND = no data

TABLE 4

| FRANK-FURTERS | 0% CTR | 0.5% PP | 0.65% PD | 2.5% SL | 2.5% SL-SD | Standard Error |
| --- | --- | --- | --- | --- | --- | --- |
| APPEARANCE | 6.35 | 6.50 | 6.44 | 6.44 | 6.35 | 0.19 |
| TEXTURE | 6.52 | 6.49 | 6.76 | 6.49 | 6.37 | 0.21 |
| FLAVOR | 6.51 | 6.52 | 6.80 | 6.38 | 6.26 | 0.21 |
| OVERALL | 6.51 | 6.43 | 6.74 | 6.30 | 6.15 | 0.2 |

| FRANK-FURTERS | 0% CTR | 0.75% PK | 1.0% PK | 2.5% PL | 2.5% PL-SD | Standard Error |
| --- | --- | --- | --- | --- | --- | --- |
| APPEARANCE | 6.31 | 6.15 | 6.23 | 6.36 | 6.35 | 0.18 |
| TEXTURE | 6.40 | 6.13 | 6.27 | 6.43 | 6.23 | 0.19 |
| FLAVOR | 6.36 | 6.24 | 6.14 | 5.92 | 6.14 | 0.2 |
| OVERALL | 6.19 | 5.94 | 6.10 | 5.98 | 6.07 | 0.2 |

Physicochemical Analysis

In the evaluation of the physicochemical property for frankfurters, seven parameters (sodium, pH, $a_w$, cooking yield, moisture, protein, and fat) were measured (Table 5). For the sodium contents the three highest values (1279-1345 mg/100 g) were found in formulations 2.5% SL, 2.5%

The formulations comprising potassium acetate and potassium diacetate showed highest overall resistance against the growth of Listeria monocytogenes and mesophilic aerobic bacteria in frankfurters during 90 days of storage at 4, 7, 10 and 15° C. Furthermore, there were no significant differences, between the formulations comprising potassium acetate and potassium diacetate and the other tested formulations, in the results of the sensory and the physicochemical analysis.

Example 3

Comparison of Preservation Compositions

Preparation of Minced Meat Samples

Untreated fresh beef minced meat was aseptically divided into 144 minced meat pieces (10 g each) and placed into sterile plastic bags. Preservation compositions (preservation composition according to the present invention and commercially available preservation compositions) were mixed into the minced beef meat samples. In addition, untreated meat samples without additives were used as control samples.

Two pathogens, *Listeria* and *Salmonella* were used as test organisms. Three *Listeria monocytogenes* strains were used as the *Listeria* cocktail and two *Salmonella typhimurium* strains, as well as one *Salmonella Enteritidis* strain were used as the *Salmonella* cocktail. Bacteria strains were pre-cultivated (1 day, +37° C., 160 rpm) in commercial Brain Heart Infusion broth (*Listeria*) or in Nutrient broth (*Salmonella*), inoculums were diluted to a concentration of c.a. 104 CFU/ml by using BHI or Nutrient broth and combined with the two bacteria-strain cocktails. 100 µl of these pathogen cocktails were added into minced meat samples, one third of the samples were left without pathogen inoculation in order to follow growths of Total aerobic bacteria which were naturally present in the meat. After preservative additions and bacterial inoculations, samples were incubated in a refrigerator at +7° C. (*Listeria*) or at +10° C. (*Salmonella*).

Growth of *Listeria monocytogenes*, *Salmonella* and Total aerobic bacteria were followed at the beginning of the test (0 day) and after 2, 7 and 14 days storage time. At each follow-up point, 0.1% peptone water (90 ml) was added into the plastic bags and meat samples (10 g) were homogenized (BagMixer 400 CC, Inter-science, France) for 1 minute and diluted with commercial DiluCups. 1 ml of these dilutions was plated as duplicate samples onto commercial 3M Petri-films, specific for *Listeria*, *Salmonella* or Total aerobic bacteria. Finally, PetriFilms were sealed to plastic bags, placed inside an incubator (+37° C.) and formed colonies were counted after 2 days of cultivation.

Table 6 discloses the tested preservation compositions and the amounts of the preservation compositions in the minced meat samples.

TABLE 6

| Formulation | Preservation composition | Amount (wt-%) | Abbreviation of the Formulation |
|---|---|---|---|
| Control | no preservative | | CTR |
| Composition 11[a] | potassium acetate 80%: potassium diacetate 20% | 0.2 | 0.2% PK |
| Composition 12[b] | a mixture of sodium diacetate, mono- and di- glycerides of fatty acids, lactic acid and sodium chloride | 0.2 | 0.2% Comp12 |
| Composition 13[b] | a mixture of sodium diacetate, mono- and di- glycerides of fatty acids, lactic acid and sodium chloride | 0.4 | 0.4% Comp13 |

Figure 3A:
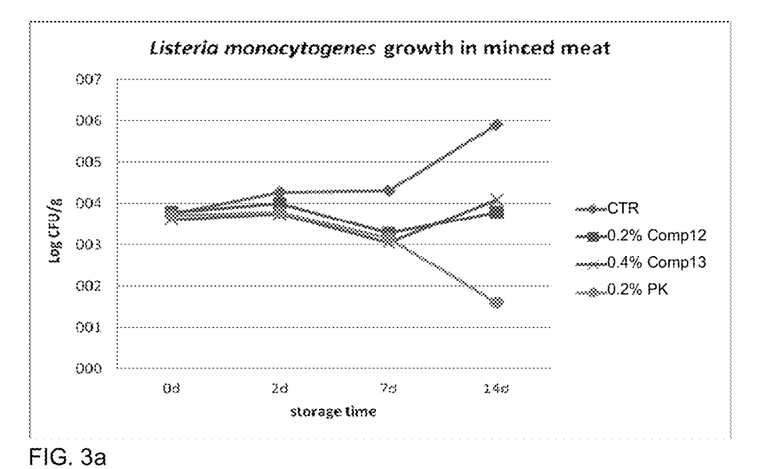
FIG. 3a shows growth of *L. monocytogenes* in minced meat samples stored at +7° C. and treated with various preservative compositions.
Figure 3B:
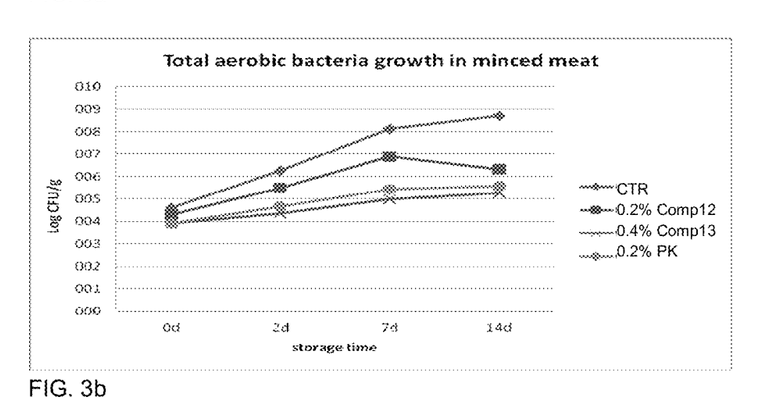
FIG. 3b shows growth of total aerobic bacteria in minced meat samples stored at +7° C. and treated with various preservative compositions.
Figure 3C:
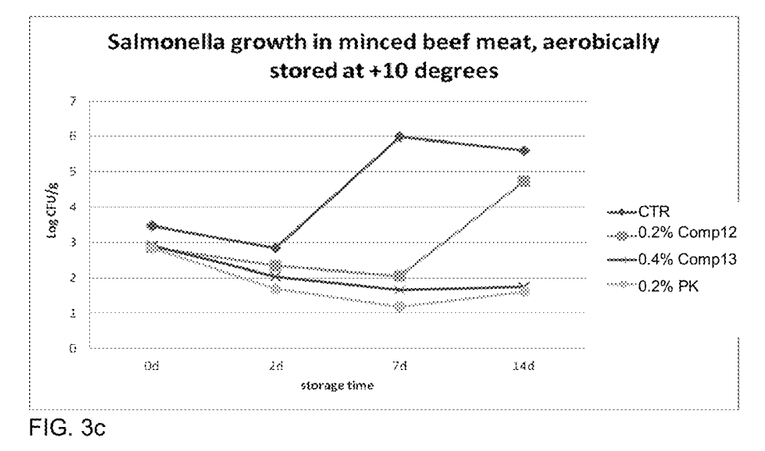
FIG. 3c shows growth of *Salmonella* in minced beef meat (aerobically stored at +10° C.) treated with various preservative compositions.

[a]Preservation composition according to the present invention.
[b]Commercially available preservation composition Results of the Experiment Growth inhibition efficacies of preservation compositions, Composition 11, Composition 12 and Composition 13, against *Listeria*, *Salmonella* and Total aerobic bacteria in raw beef minced meat are shown in FIGS. 3a, 3b and 3c.

Inoculated *Listeria* population (~5×10³ cfu/ml) grew 3 logs (from log 3 to log 6) in meat samples without preservatives, whereas all studied preservative compositions inhibited *Listeria* population (growth was less than 1 log), during the 14 d storage (FIG. 3a). Composition 11 was bactericidal. It lowered the initial *Listeria* inoculation level. On the contrary, Composition 12 and Composition 13 were bacteriostatic. That is, the *Listeria* level remained at the inoculation level.

FIG. 3b shows the high (log 5) initial (0 day) Total aerobic bacteria content in minced beef meat. This level further increased 4 logs (from log 5 to log 9) during the 14 days cultivation at +7° C. storage in meat samples without preservatives. On the contrary, all studied preservatives inhibited the Total aerobic bacteria growth 2 to 4 logs. Composition 12 inhibited Total aerobic bacteria growth 2 logs. Composition 13 showed as good inhibition as Composition 11.

Inoculated *Salmonella* population (~10^3 cfu/ml) grew 3 logs (from log 3 to log 6) in meat samples without preservatives, whereas all studied preservative compositions inhibited the *Salmonella* population. *Salmonella* growth was prevented (growth was less than 1 log), for 14 days (FIG. 3c) with all studied compositions, except with Composition 12 which enabled good *Salmonella* growth after 7 d.

Based on the results, Composition 11 effectively inhibits *Listeria*, *Salmonella* and Total aerobic bacteria in aerobically stored raw minced beef meat. When taking into account the dosage levels and obtained antimicrobial efficacies, Composition 11 outperformed the other test compositions.

The invention claimed is:

1. A foodstuff preservation composition comprising potassium acetate and alkali metal diacetate, wherein the weight ratio of potassium acetate:alkali metal diacetate is 4 to 1, wherein the foodstuff preservation composition is bactericidal for *Listeria* at temperatures between about 7° C. to 15° C.

2. The foodstuff preservation composition according to claim 1, wherein the potassium acetate is present in an amount of 78-80 wt-% based on the weight of the final foodstuff preservation composition.

3. The foodstuff preservation composition according to claim 1, wherein the alkali metal diacetate is sodium diacetate, potassium diacetate or a mixture thereof.

4. The foodstuff preservation composition according to claim 1, wherein the foodstuff preservation composition is in a dry solid form.

5. The foodstuff preservation composition according to claim 4, wherein the foodstuff preservation composition further comprises an anti-caking agent.

6. The foodstuff preservation composition according to claim 5, wherein the anti-caking agent is selected from the group consisting of magnesium oxide, magnesium silicate, magnesium carbonate, magnesium phosphate, fatty acid salts of magnesium or calcium, silicon dioxide, fatty acid triglyceride, cellulose and mixtures thereof.

7. The foodstuff preservation composition according to claim 1, wherein the foodstuff preservation composition inhibits the growth of a *Listeria* strain or is bactericidal when incorporated into a foodstuff product at an amount of 0.25-1.25 wt-% based on the weight of the final foodstuff product.

8. A method for preserving foodstuff, wherein the method comprises mixing the foodstuff preservation composition according to claim 1 with foodstuff.

9. A method for preventing growth of a *Listeria* strain and mesophilic aerobic bacteria by storing a foodstuff with the foodstuff preservation composition according to claim 1 under storage conditions.

10. The foodstuff preservation composition according to claim 1, wherein the foodstuff preservation composition is bactericidal for *Listeria* for at least 90 days.

11. A dry solid foodstuff preservation composition consisting of: potassium acetate; and alkali metal diacetate,
wherein the weight percent ratio of the potassium acetate to the alkali metal diacetate of the foodstuff preservation composition is 4:1, and
wherein the foodstuff preservation composition is bactericidal for *Listeria* at temperatures between about 7° C. to 15° C.

12. The dry solid foodstuff preservation composition of claim 11, wherein the alkali metal diacetate is potassium diacetate.

13. The dry solid foodstuff preservation composition of claim 11, wherein the foodstuff preservation composition is bactericidal for *Listeria* for at least 90 days.

14. A dry solid foodstuff preservation composition consisting of:
potassium acetate;
an alkali metal diacetate; and
an anti-caking agent, wherein the weight percent ratio of the potassium acetate to the alkali metal diacetate is 4:1, and
wherein the foodstuff preservation composition is bactericidal for *Listeria* at temperatures between about 7° C. to 15° C.

15. The dry solid foodstuff preservation composition of claim 14, wherein the alkali metal diacetate is potassium diacetate.

16. The dry solid foodstuff preservation composition of claim 14, wherein the anti-caking agent is selected from the group consisting of: magnesium oxide, magnesium silicate, magnesium carbonate, magnesium phosphate, fatty acid salts of magnesium or calcium, silicon dioxide, fatty acid triglyceride, cellulose and mixtures thereof.

17. The dry solid foodstuff preservation composition of claim 14, wherein the anti-caking agent is calcium stearate or magnesium stearate.

18. The dry solid foodstuff preservation composition of claim 14, wherein the foodstuff preservation composition is bactericidal for *Listeria* for at least 90 days.

* * * * *